(12) United States Patent
Albouyeh et al.

(10) Patent No.: US 10,540,445 B2
(45) Date of Patent: Jan. 21, 2020

(54) INTELLIGENT INTEGRATION OF GRAPHICAL ELEMENTS INTO CONTEXT FOR SCREEN READER APPLICATIONS

(71) Applicant: International Business Machines Corporation, Armonk, NY (US)

(72) Inventors: Shadi E. Albouyeh, Raleigh, NC (US); Mark P. Delaney, Raleigh, NC (US); Robert H. Grant, Austin, TX (US); Trudy L. Hewitt, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 60 days.

(21) Appl. No.: 15/802,976

(22) Filed: Nov. 3, 2017

(65) Prior Publication Data

US 2019/0138598 A1    May 9, 2019

(51) Int. Cl.
*G06F 17/27* (2006.01)
*G09B 21/00* (2006.01)
*G06F 17/21* (2006.01)

(52) U.S. Cl.
CPC .......... *G06F 17/2785* (2013.01); *G06F 17/21* (2013.01); *G09B 21/003* (2013.01); *G09B 21/006* (2013.01)

(58) Field of Classification Search
CPC .... G06F 16/58; G06F 17/241; G06F 17/2785; G06F 16/583; G06F 16/5866; G06F 16/54; G06F 16/285; G06K 9/6267; G06K 9/00684; G06K 9/00; G06K 9/00442; G06K 9/00671; G06K 9/3258
See application file for complete search history.

(56) References Cited

U.S. PATENT DOCUMENTS

| 9,208,171 B1* | 12/2015 | Cotting | G06F 16/29 |
| 9,317,531 B2* | 4/2016 | Baker | G06F 17/241 |
| 9,798,732 B2* | 10/2017 | Isaacson | G06F 16/1734 |
| 10,126,927 B1* | 11/2018 | Fieldman | G06F 3/04847 |

(Continued)

OTHER PUBLICATIONS

"How to Make Your Blog Accessible to Blind Readers", American Foundation for the Blind, http://www.afb.org/info/programs-and-services/technology-evaluation/creating-accessible-websites/how-to-make-your-blog-accessible/1235#alt, Downloaded fro the internet on Sep. 11, 2017, 6 pages.

(Continued)

*Primary Examiner* — Richemond Dorvil
*Assistant Examiner* — Mark Villena
(74) *Attorney, Agent, or Firm* — Francis Lammes; Stephen J. Walder, Jr.; Alexander G. Jochym

(57) ABSTRACT

A mechanism is provided for intelligently integrating descriptions of images into surrounding text for a screen reader. A natural language understanding image description is determined for an image in a document. For each sentence of a set of sentences in the text of the document, a relatedness score between the sentence and the natural language understanding image description is determined thereby forming a set of relatedness scores. A highest relatedness score is determined from the set of relatedness scores. The natural language image description is inserted in close proximity to a sentence associated with the highest relatedness score, such that, when the text is read out by the screen reader, the natural language image description of the image is read out in close proximity to the sentence.

20 Claims, 6 Drawing Sheets

(56) References Cited

U.S. PATENT DOCUMENTS

| | | | | |
|---|---|---|---|---|
| 2003/0145279 | A1* | 7/2003 | Bourbakis | G06F 16/958 715/256 |
| 2009/0076797 | A1* | 3/2009 | Yu | G06F 16/58 704/9 |
| 2010/0220929 | A1* | 9/2010 | Misawa | G06F 16/5846 382/190 |
| 2011/0055345 | A1* | 3/2011 | Chen | H04L 51/08 709/206 |
| 2011/0167081 | A1* | 7/2011 | Kosaka | G06K 9/00456 707/769 |
| 2012/0141023 | A1* | 6/2012 | Wang | H04N 1/00148 382/162 |
| 2013/0218858 | A1* | 8/2013 | Perelman | G06F 16/9535 707/706 |
| 2014/0114643 | A1* | 4/2014 | Baker | G06F 17/241 704/9 |
| 2014/0146053 | A1* | 5/2014 | Cragun | G06K 9/00 345/467 |
| 2014/0316770 | A1 | 10/2014 | Sevenster et al. | |
| 2017/0061250 | A1* | 3/2017 | Gao | G06F 16/3347 |
| 2017/0115853 | A1* | 4/2017 | Allekotte | G06F 3/0482 |
| 2017/0132498 | A1* | 5/2017 | Cohen | G06F 17/2785 |
| 2017/0132821 | A1* | 5/2017 | Valliani | G06F 17/241 |
| 2017/0270123 | A1* | 9/2017 | Jhamtani | G06F 17/2785 |
| 2017/0337220 | A1* | 11/2017 | Metz | G06K 9/6201 |
| 2017/0371856 | A1* | 12/2017 | Can | G06F 17/2881 |
| 2018/0143980 | A1* | 5/2018 | Tanikella | G06Q 50/01 |
| 2018/0293440 | A1* | 10/2018 | Kikin Gil | G06K 9/00684 |
| 2018/0373979 | A1* | 12/2018 | Wang | G06K 9/00671 |

OTHER PUBLICATIONS

"Image Descriptions", Stanford Online Accessibility Program, https://soap.stanford.edu/tips-and-tools/tips/image-descriptions, Jun. 9, 2015, 3 pages.

Karpathy, Andrej et al., "Deep Fragment Embeddings for Bidirectional Image Sentence Mapping", Neural Information Processing Systems (NIPS '14), Montreal, Canada, Dec. 8-13, 2014, 9 pages.

Newton, Casey, "Facebook begins using artificial intelligence to describe photos to blind users", http://www.theverge.com/2016/4/5/11364914/facebook-automatic-alt-tags-blind-visually-impared, Apr. 5, 2016, 8 pages.

* cited by examiner

INTELLIGENT INTEGRATION OF GRAPHICAL ELEMENTS INTO CONTEXT FOR SCREEN READER APPLICATIONS

BACKGROUND

The present application relates generally to an improved data processing apparatus and method and more specifically to mechanisms for intelligent integration of graphical elements into context for screen reader applications.

Screen reader applications are software programs that allow blind or visually impaired users to read information displayed on a computer screen with a speech synthesizer or braille display. A screen reader is the interface between the computer's operating system, its applications, and the user. The user sends commands by pressing different combinations of keys on the computer keyboard or braille display to instruct the speech synthesizer what to say and to speak automatically when changes occur on the computer screen. A command can instruct the synthesizer to read or spell a word, read a line or full screen of text, find a string of text on the screen, announce the location of the computer's cursor or focused item, and so on. In addition, it allows users to perform more advanced functions, such as locating text displayed in a certain color, reading pre-designated parts of the screen on demand, reading highlighted text, and identifying the active choice in a menu. Users may also use the spell checker in a word processor or read the cells of a spreadsheet with a screen reader.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for intelligently integrating descriptions of images into surrounding text for a screen reader. The illustrative embodiment determines a natural language understanding image description for an image in a document. For each sentence of a set of sentences in the text of the document, the illustrative embodiment determines a relatedness score between the sentence and the natural language understanding image description, thereby forming a set of relatedness scores. The illustrative embodiment determines a highest relatedness score from the set of relatedness scores. The illustrative embodiment inserts the natural language image description in close proximity to a sentence associated with the highest relatedness score, such that, when the text is read out by the screen reader, the natural language image description of the image is read out in close proximity to the sentence.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
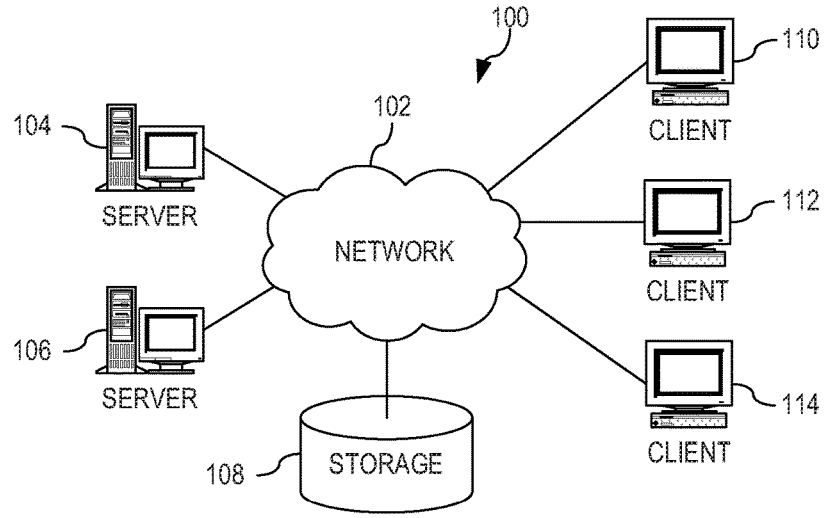
FIG. 1 is an example diagram of a distributed data processing system in which aspects of the illustrative embodiments may be implemented.

The illustrative embodiments provide mechanisms for intelligent integration of graphical elements into context for screen reader applications. As noted above, screen reader applications are software programs that allow blind or visually impaired users to read information displayed on a computer screen with a speech synthesizer or Braille display. When an image, such as a photo, table, chart, or the like, is displayed on the computer screen, image recognition mechanisms, natural language processing mechanisms, or the like, executed by the screen reader application are utilized to describe the image. However, current screen reader applications describe the image as the image appears within the document being displayed on the computer screen. Describing the image in this fashion may not always flow or make sense when combined with text within the document that is displayed on the computer screen. That is, images, such as photos, tables, charts, or the like, are not always placed exactly where a related description appears within the information displayed on the computer screen. For example, a first sentence of paragraph displayed on the computer screen may refer to a figure; however, the referred-to figure may appear at the end of paragraph, at the end of a subsequent paragraph, or even on a different page of the document. Thus, describing a figure as it appears on the display of the computer screen may cause confusion to the blind or visually impaired user and cause a less than ideal user experience.

Thus, the illustrative embodiments provide a graphical element integration mechanism that intelligently determines the best timing and technique for integrating descriptions of images into surrounding text for a screen reader application. In accordance with the illustrative embodiments, when a document is to be read to a blind or visually impaired user with a speech synthesizer or Braille display, the graphical element integration mechanism analyzes the text of the document as well as any images that appear within the document. With regard to analyzing the images, the graphical element integration mechanism analyzes the image through one or more image recognition mechanisms to generate a natural language description of the image. The graphical element integration mechanism then compares the natural language description of the image to other sentences within the text of the document using, for example, cosine similarity, ontology mapping, or the like. The graphical element integration mechanism considers semantic relationships of different words to determine a sentence related to the natural language description of the image. For example, if the natural language description of the image is "The boy playing with the ball outside" and a sentence is identified that reads "Jonathan is in the grass entertaining himself with his ball" then the graphical element integration mechanism detects this sentence within the text with a most appropriate similarity to the natural language description of the image. Thus, when the speech synthesizer or Braille display reads the document to the blind or visually impaired user, during the reading of the text, the graphical element integration mechanism inserts at the end of "Jonathan is in the grass entertaining himself with his ball" a description such as: "An image is provided showing the boy playing with the ball outside." Thus, the graphical element integration mechanism considers whether the text provided is complimentary with the description of the graphic and provides an indicator that there is a graphic that represents the image. Therefore, when the text is read, a later description of the image is not confusing to the user as current screen reader applications provide.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
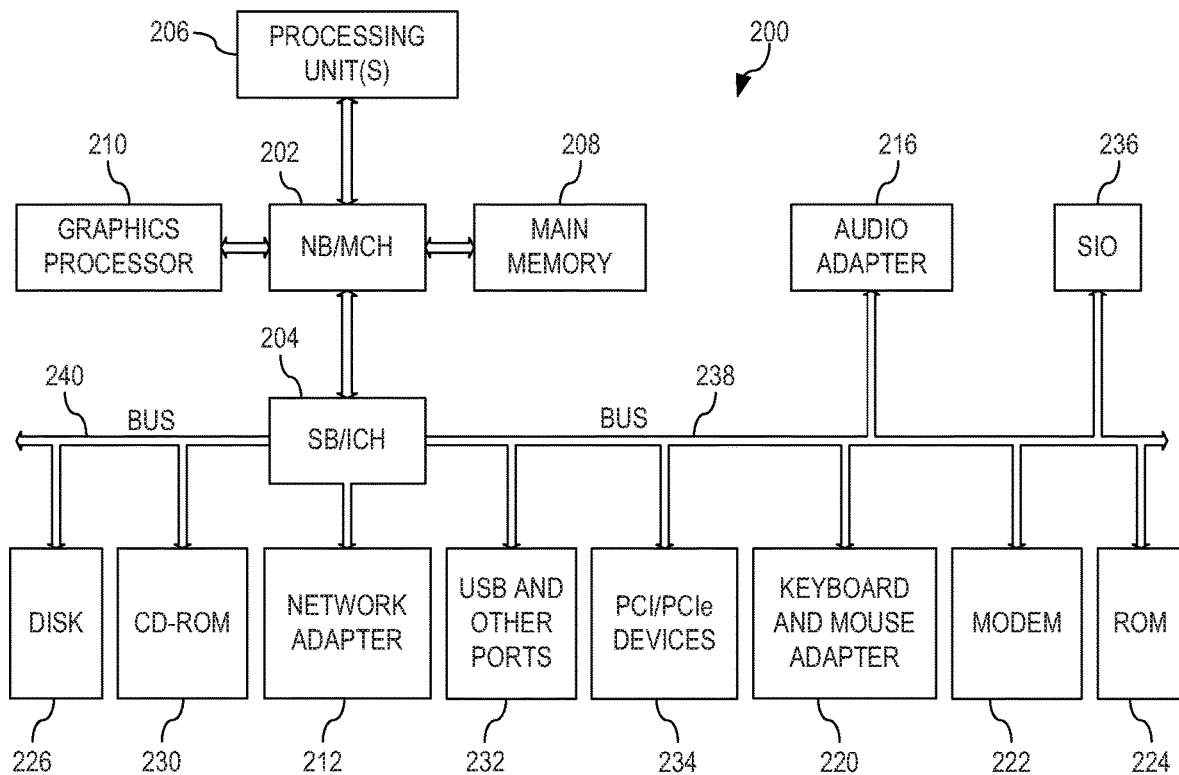
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement a graphical element integration mechanism for intelligent integration of graphical elements into context for screen reader applications. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, and software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates an intelligent integration of graphical elements into context for screen reader applications.

As noted above, the mechanisms of the illustrative embodiments utilize specifically configured computing devices, or data processing systems, to perform the operations for intelligently integrating graphical elements into context for screen reader applications. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System P® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the graphical element integration mechanism for intelligent integration of graphical elements into context for screen reader applications.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
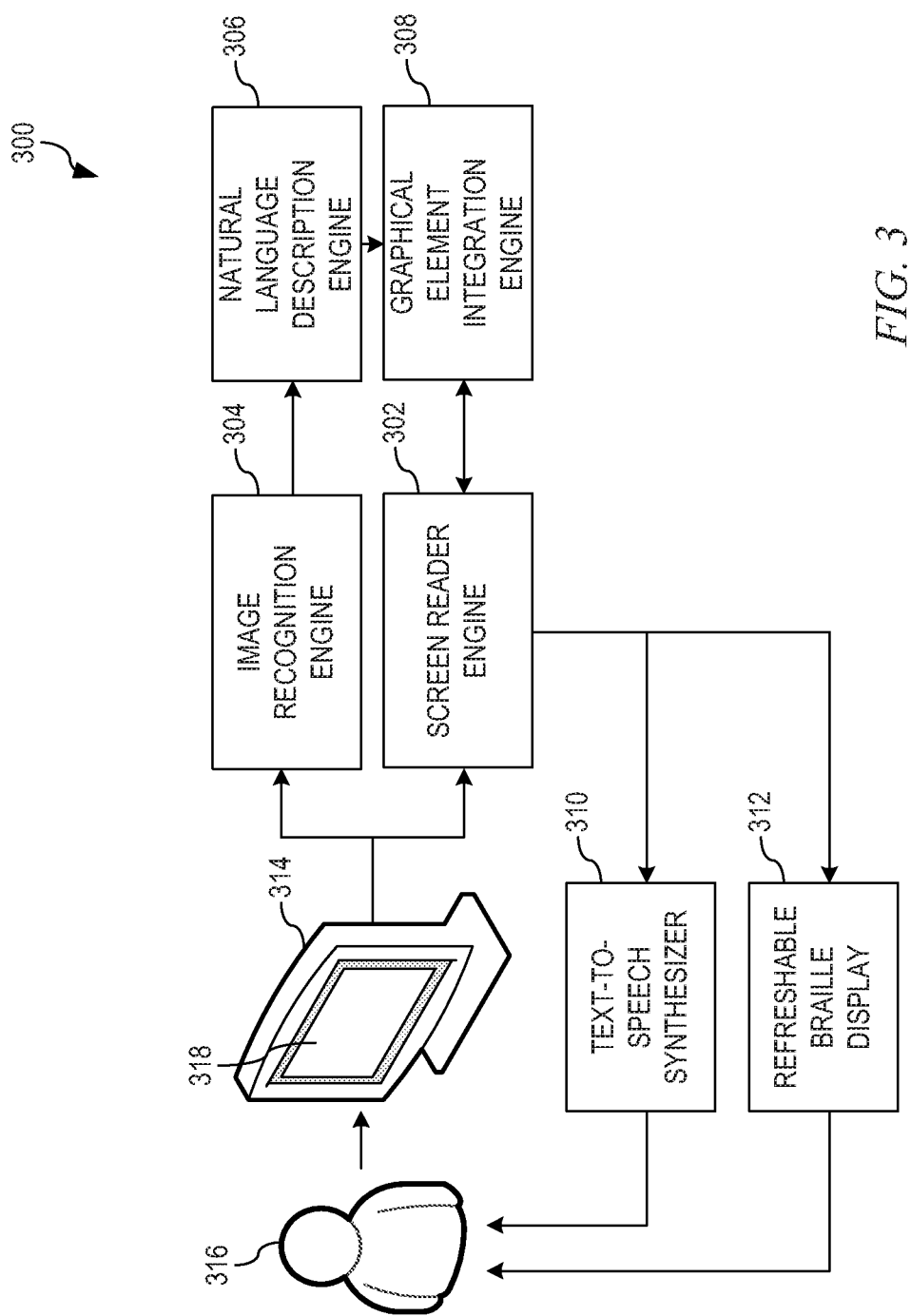
FIG. 3 depicts a functional block diagram of a data processing system that intelligently integrates descriptions of images into surrounding text for a screen reader application in accordance with an illustrative embodiment.

FIG. 3 depicts a functional block diagram of a data processing system that intelligently integrates descriptions of images into surrounding text for a screen reader application in accordance with an illustrative embodiment. Data processing system 300 comprises screen reader engine 302, image recognition engine 304, natural language description engine 306, graphical element integration engine 308, and text-to-speech synthesizer 310 and/or refreshable Braille display 312. In a first embodiment, when a blind or visually impaired user 316 requests a document 318 appearing on a display 314 of data processing system 300 to be read to the blind or visually impaired user 316 via speech synthesizer/braille display engine 310, screen reader engine 302 analyzes text within document 318. More specifically, screen reader engine 302 analyzes the text within document 318 and converts the text to an audio or braille output that the blind or visually impaired user 316 may identify. At substantially a same time, image recognition engine 304 identifies any images within document 318 and, for each identified image; natural language description engine 306 generates a natural language understating (NLU) image description for the identified image. Natural language description engine 306 may simply utilize a caption associated with the image if such a caption exists or generate an image specific description based on an analysis of the features within the identified image.

For each image identified by image recognition engine 304 and for the NLU image description generated by natural language description engine 306, graphical element integration engine 308 compares the NLU image description to the sentences within the text of document 318 identified by screen reader engine 302. More specifically, graphical element integration engine 308 compares the NLU image description to the sentences within the text of document 318 using soft cosine similarity. The soft cosine measure is a measure of "soft" similarity between two vectors, i.e., the measure that considers similarity of pairs of features. The soft cosine measure proposes considering the similarity of features in a vector space model (VSM), which allows generalization of the concepts of cosine measure and also the idea of similarity (soft similarity). For example, in the field of natural language processing (NLP) the similarity among features is quite intuitive. Features such as words, n-grams, or syntactic n-grams may be quite similar, though formally they are considered as different features in the VSM. For example, words "play" and "game" are different words and thus are mapped to different dimensions in VSM, yet the words "play" and "game" are related semantically. Therefore, given two N-dimension vectors a and b, the soft cosine similarity value is calculated as follows:

$$\text{soft\_cosine}_1(a, b) = \frac{\sum_{i,j}^{N} s_{ij} a_i b_j}{\sqrt{\sum_{i,j}^{N} s_{ij} a_i a_j} \sqrt{\sum_{i,j}^{N} s_{ij} b_i b_j}},$$

where $s_{ij}$=similarity(feature, feature).

If graphical element integration engine 308 identifies one or more words during the comparison that are different but semantically related, then graphical element integration engine 308 utilizes ontology mapping or semantic integration to bridge the correlation. That is, graphical element integration engine 308 interrelates information from the NLU image description and each sentence within the text of document 318 focusing on the organization of and action upon information within the image description and each particular sentence. Thus, given two ontology's, the NLU image description (A) and each sentence within the text of document 318 (B), graphical element integration engine 308 maps one ontology such that for each concept (node) in ontology A, graphical element integration engine 308 attempts to find a corresponding concept (node) that has the same or similar semantics in ontology B, and vice versa. Thus, for each sentence within document 318, graphical element integration engine 308 obtains an ontological mapping value, i.e. a sentence most related to the NLU image description.

Thus, for each sentence within the text of document 318, graphical element integration engine 308 generates a relatedness score of the sentence to the NLU image description using the soft cosine similarity value and/or the ontological mapping value. Utilizing the relatedness scores for each sentence within the text of document 318, graphical element integration engine 308 presents screen reader engine 302 the sentence with the highest relatedness score. Accordingly, when screen reader engine 302 provides the identified sentence to text-to-speech synthesizer 310 and/or refreshable Braille display 312 for further presentation to the blind or visually impaired user 316, screen reader 302 provides the NLU image description in close spatial or temporal proximity to the identified sentence, such as immediately following the identified sentence, to text-to-speech synthesizer 310 and/or refreshable Braille display 312 for further presentation to the blind or visually impaired user 316.

As stated previously, when generating the NLU image description for an identified image, natural language description engine 306 may simply utilize a caption associated with the image if such a caption exists or generate an image specific description based on an analysis of the features within the identified image. However, in a second embodiment, natural language description engine 306 may determine that the caption associated with the identified image is not comprehensive. For example, a caption associated with an image may read "A man sitting at a desk," which may be a general description when the text of document 318 is taken into consideration. Thus, natural language description engine 306 may utilize the caption associated with the image and generate an image specific description based on an analysis of the features within the identified image. For example, "An image is provided representing a team member sitting at a desk." If natural language description engine 306 provide two different NLU descriptions to graphical element integration engine 308, graphical element integration engine 308 compares each NLU image description to the sentences within the text of document 318 using soft cosine similarity and/or ontological mapping to generate a relatedness score of each sentence to each NLU image description using the soft cosine similarity value and/or the ontological mapping value. Utilizing the relatedness scores for each sentence/NLU image description pair, graphical element integration engine 308 presents screen reader engine 302 the sentence with the highest relatedness score as well as the associated NLU image description. Accordingly, when screen reader engine 302 provides the identified sentence to text-to-speech synthesizer 310 and/or refreshable Braille display 312, screen reader 302 provides the NLU image description associated with the highest relatedness score in close spatial or temporal proximity to the identified sentence, such as immediately following the identified sentence.

In a third embodiment, if the relatedness score of a sentence within the text of document 318 to an NLU description is above a threshold indicating that the NLU image description is either exactly or is substantially similar to the sentence within the text of document 318, graphical element integration engine 308 presents screen reader engine 302 an indication that the NLU image description should be ignored and thus, not presented to text-to-speech synthesizer 310 and/or refreshable Braille display 312 for further presentation to the blind or visually impaired user 316.

Figure 4:
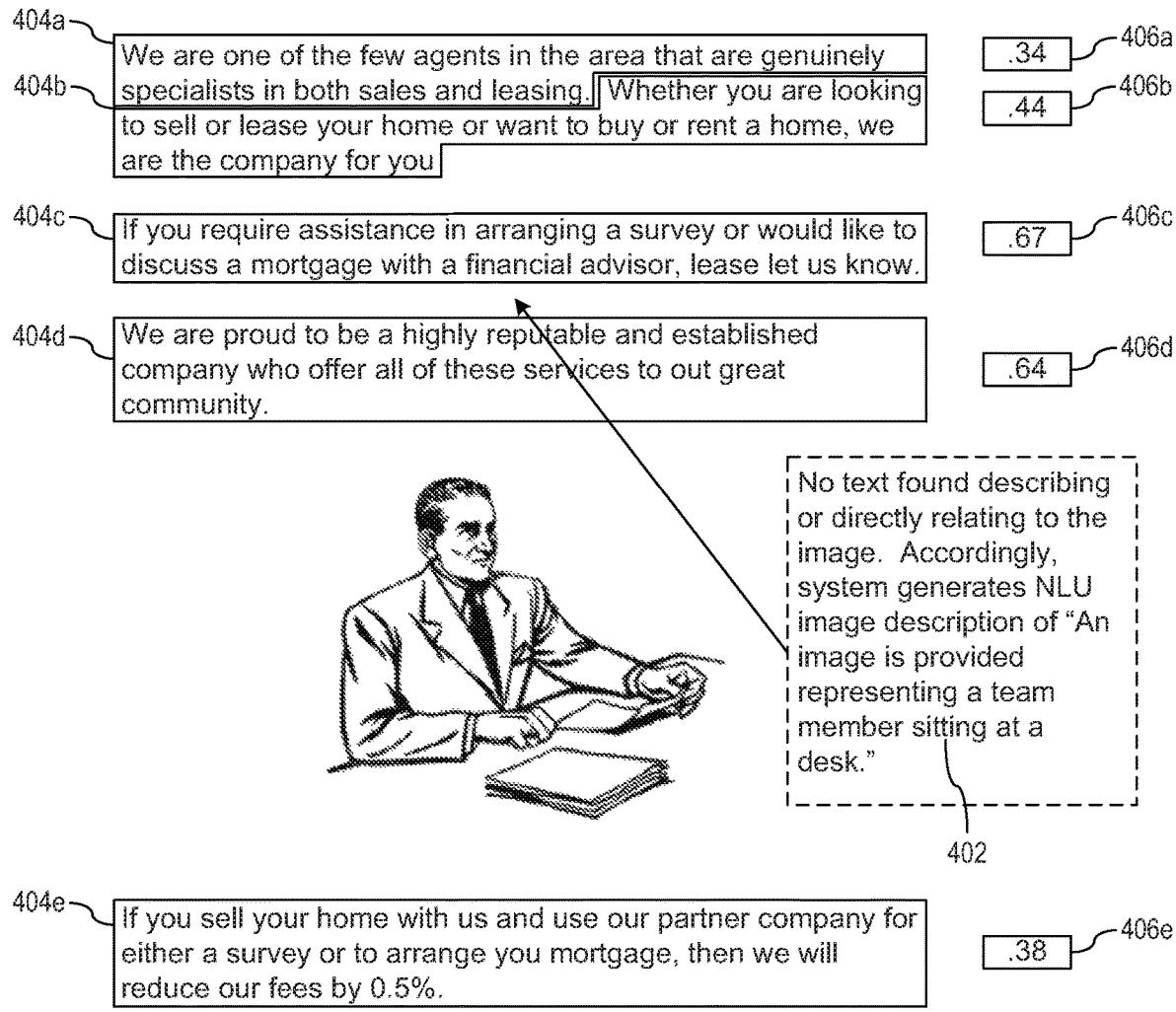
FIG. 4 depicts a first example of intelligently integrating a description of an image into surrounding text for a screen reader application in accordance with an illustrative embodiment.

In accordance with the first embodiment described above, FIG. 4 depicts a first example of intelligently integrating a description of an image into surrounding text for a screen reader application in accordance with an illustrative embodiment. In this example, utilizing the operations described in FIG. 3, a NLU image description 402 is generated for the image. The NLU image description reads: "An image is provided representing a team member sitting at a desk." Based on the relatedness scores 406a-406e identified for each of sentences 404a-404e, graphical element integration engine identifies the sentence with the highest relatedness score, sentence 404c, to the screen reader engine with an indication that the NLU image description 402 should be inserted after sentence 404c. Thus, the screen reader engine presents, in order, sentence 404a, sentence 404b, sentence 404c, NLU image description 402, sentence 404d, and sentence 404e to the text-to-speech synthesizer and/or the refreshable Braille display for further presentation to the blind or visually impaired user.

Figure 5:
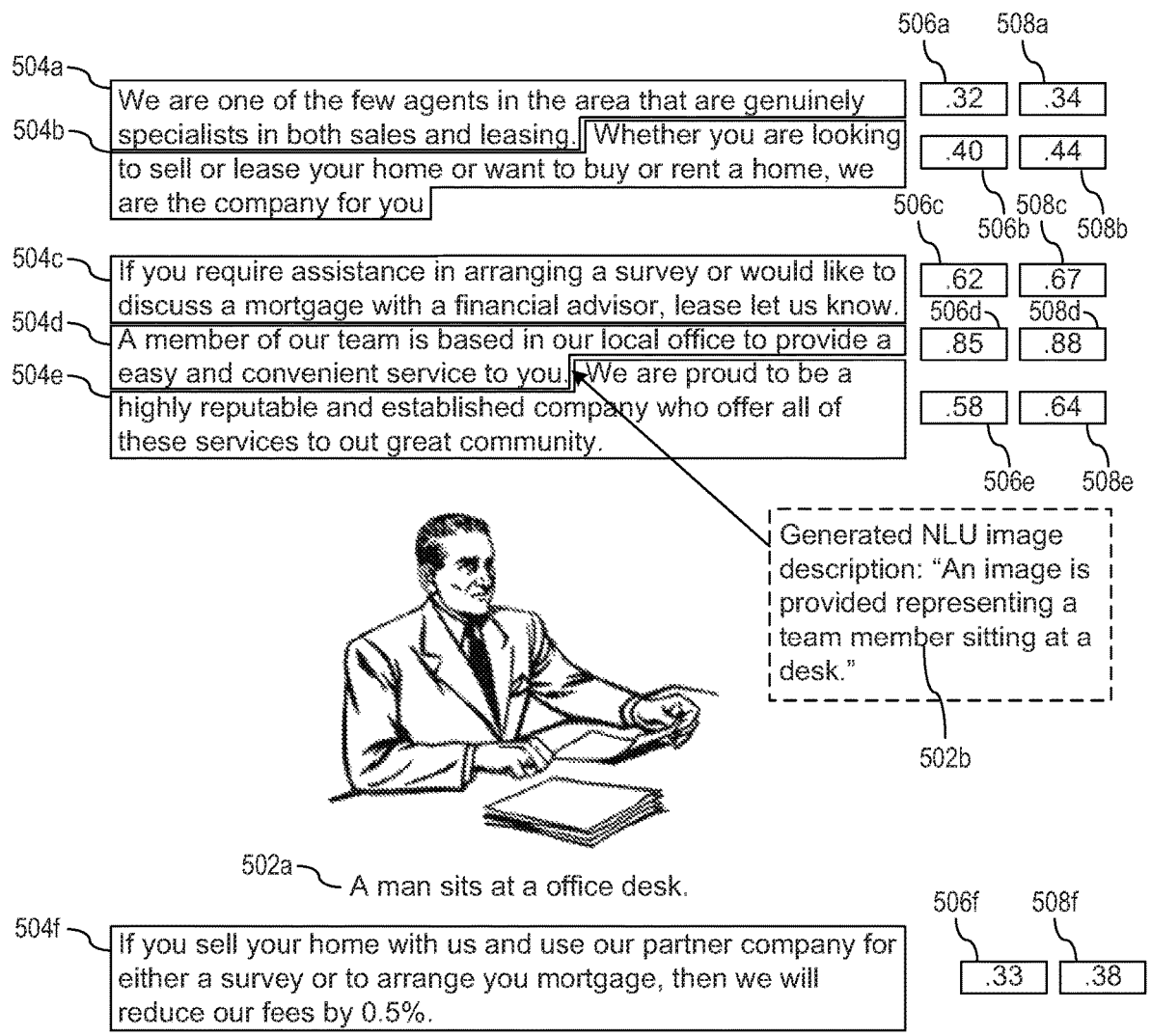
FIG. 5 depicts a second example of intelligently integrating a description of an image into surrounding text for a screen reader application in accordance with an illustrative embodiment.

In accordance with the second embodiment described above, FIG. 5 depicts a second example of intelligently integrating a description of an image into surrounding text for a screen reader application in accordance with an illustrative embodiment. In this example, utilizing the operations described in FIG. 3, an identified image within the document has an associated caption that reads "A man sitting at a desk," which becomes NLU description 502a. If the graphical element integration engine is enabled to identify captions as well as generate a NLU image description, then the graphical element integration engine generates NLU image description 502b that reads: "An image is provided representing a team member sitting at a desk." Using both NLU descriptions 502a and 502b, the graphical element integration engine identifies relatedness scores for each NLU description/sentence pair from NLU descriptions 502a-502b and sentences 504a-504f. Relatedness scores 506a-506f relate to NLU image description 502a and relatedness scores 508a-508f relate to NLU image description 502b. Based on the relatedness scores 506a-506f and 508a-508f identified for each NLU description/sentence pair, the graphical element integration engine utilizes the sentence/NLU image description with the highest relatedness score, sentence 504d/NLU image description 502b, and presents the screen reader engine with an indication that the NLU image description 502b should be inserted after sentence 504dc and thus, the screen reader engine presents, in order, sentence 504a, sentence 504b, sentence 504c, sentence 504d, NLU image description 502b, sentence 504e, and sentence 504f to the text-to-speech synthesizer and/or the refreshable Braille display for further presentation to the blind or visually impaired user.

Figure 6:
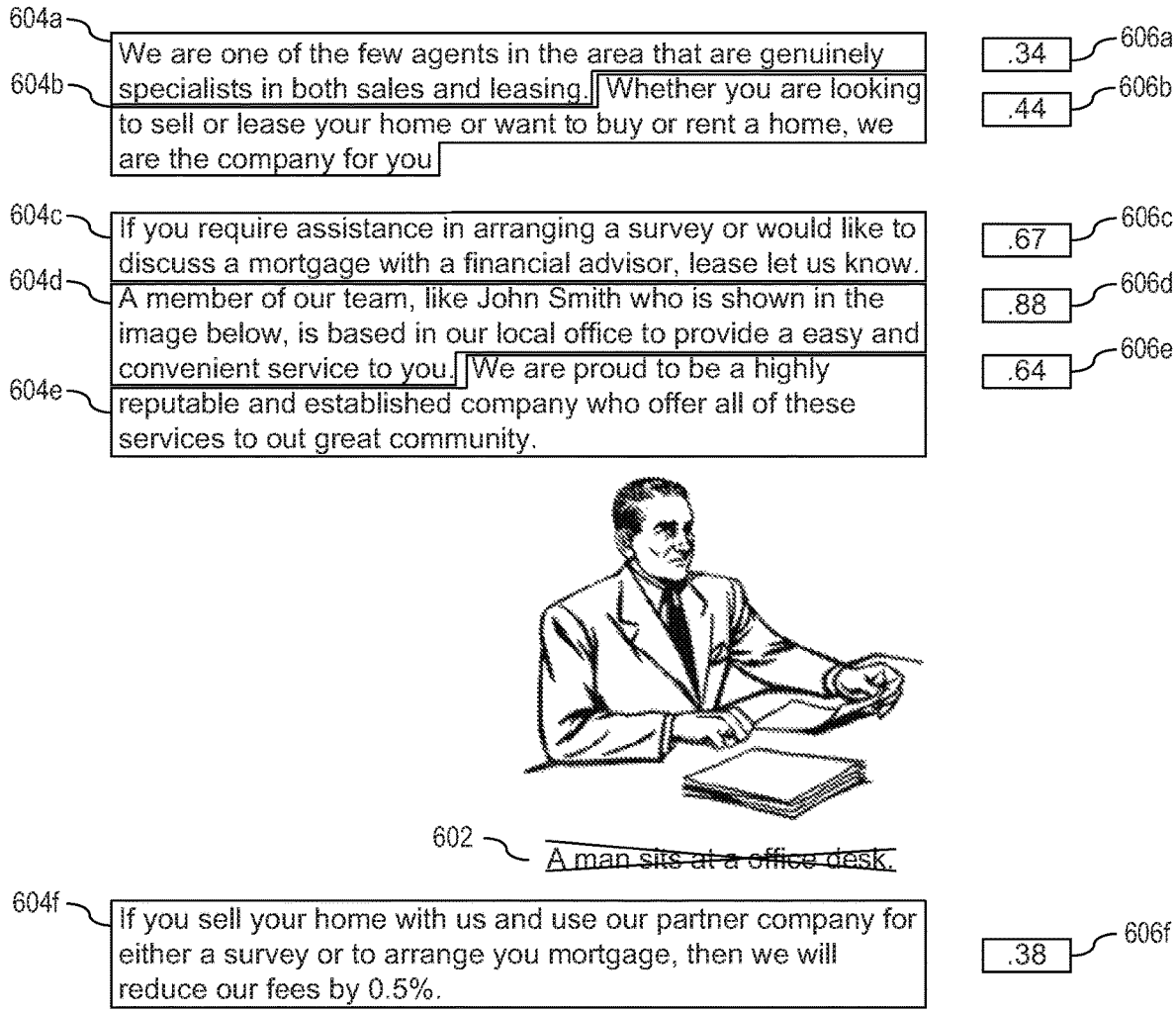
FIG. 6 depicts a third example of intelligently integrating a description of an image into surrounding text for a screen reader application in accordance with an illustrative embodiment.

In accordance with the third embodiment described above, FIG. 6 depicts a third example of intelligently integrating a description of an image into surrounding text for a screen reader application in accordance with an illustrative embodiment. In this example, utilizing the operations described in FIG. 3, an identified image within the document has an associated caption that reads "A man sitting at a desk," which becomes NLU description 602. Using NLU image descriptions 602, the graphical element integration engine generates a relatedness score for each of sentences 604a-604f. Based on the relatedness scores 606a-606f, graphical element integration engine identifies that the highest relatedness score 606d of 0.88 associated with sentence 604d is above a threshold. Accordingly, graphical element integration engine presents the screen reader engine with an indication that the NLU image description 602 should not be included when presenting the sentences of the document. Thus, the screen reader engine presents, in order, sentence 604*a*, sentence 604*b*, sentence 604*c*, sentence 604*d*, sentence 604*e*, and sentence 604*f* to the text-to-speech synthesizer and/or the refreshable Braille display for further presentation to the blind or visually impaired user.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 7:
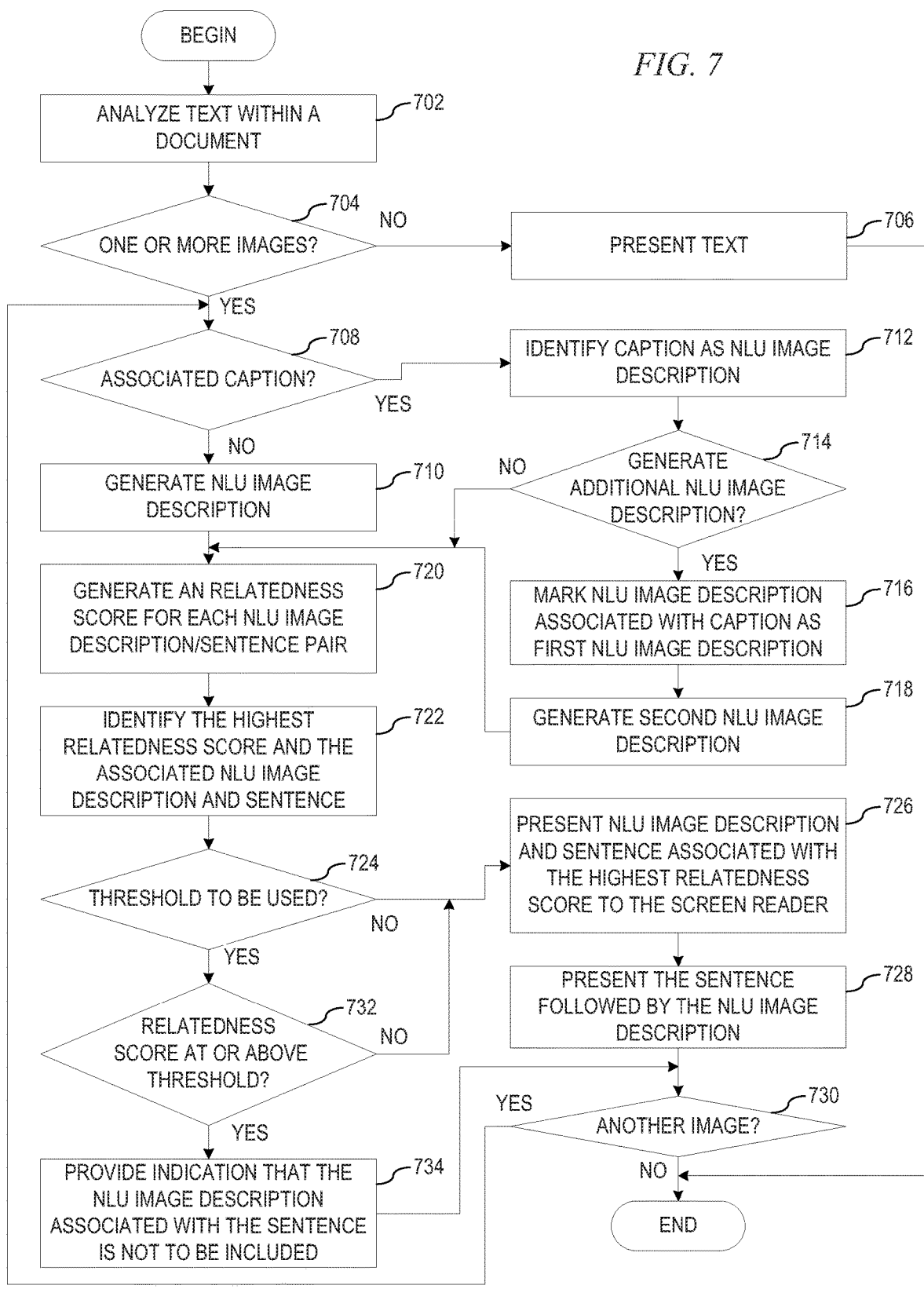
FIG. 7 depicts an exemplary flow diagram of the operation performed in intelligently integrating descriptions of images into surrounding text for a screen reader application in accordance with an illustrative embodiment.

FIG. 7 depicts an exemplary flow diagram of the operation performed in intelligently integrating descriptions of images into surrounding text for a screen reader application in accordance with an illustrative embodiment. As the operation begins, a screen reader engine analyzes text within a document (step 702). A determination is made by an image recognition engine whether there is one or more images within the document (step 704). If at step 704 there are no images in the document, then the screen reader engine presents the text to a blind or visually impaired user via a text-to-speech synthesizer and/or a refreshable Braille display (step 706), with the operation ending thereafter.

If at step 704 there arc one or more images in the document, for each identified image a natural language description engine determines whether there is an associated caption describing the identified image (step 708). If at step 708 there is no associated caption, the natural language description engine generates a natural language understating (NLU) image description for the identified image (step 710). If at step 708 there is an associated caption, the natural language description engine identifies the caption as a NLU image description (step 712). The natural language description engine then determines whether another NLU image description should be generated based on user preferences (step 714). The user preferences may indicate that the user always wants to utilize the exact caption rather than a NLU image description or indicate that, if a caption exists, generates another NLU image description for comparison. If at step 714 another NLU image description is to be generated, then the natural language description engine marks the NLU image description at step 712 as a first NLU image description (step 716) and generates a second NLU image description (step 718).

From step 710, step 718, or if at step 714 another NLU image description is not to be generated, the graphical element integration engine generates a relatedness score for each NLU image description/sentence pair (step 720). Once a relatedness score has been generated for each NLU image description/sentence pair, the graphical element integration engine identifies the highest relatedness score and the associated NLU image description and sentence (step 722). The graphical element integration engine determines whether a threshold is to be utilized (step 724). If at step 724 the threshold is not to be used, then the graphical element integration engine presents the NLU image description and sentence associated with the highest relatedness score to the screen reader (step 726) so that the screen reader presents the sentence followed by the NLU image description to the blind or visually impaired user via a text-to-speech synthesizer and/or a refreshable Braille display (step 728). The graphical element integration engine then determines whether there is another image to analyze (step 730). If at step 730 there is no other image to analyze, the operation ends. If at step 730 there is another image to analyze, then operation returns to step 708.

If at step 724 the threshold is to be used, then the graphical element integration engine determines whether the highest relatedness score is at or above the threshold (step 732). If at step 732 the highest relatedness score is below the threshold, then the operation proceeds to step 726. If at step 732 the highest relatedness score is at or above the threshold, then the graphical element integration engine provides an indication to the screen reader that the NLU image description associated with the sentence is not to be included when presenting the sentence to the blind or visually impaired user via a text-to-speech synthesizer and/or a refreshable Braille display (step 734), with the operation proceeding to step 730 thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for intelligently integrating descriptions of images into surrounding text for a screen reader. When a document is to be read to a blind or visually impaired with a speech synthesizer or braille display, the graphical element integration mechanism analyzes the text of the document as well as any images that appear within the document. With regard to analyzing the images, the graphical element integration mechanism analyzes the image through one or more image recognition mechanisms to generate a natural language description of the image. The graphical element integration mechanism then compares the natural language description of the image to other sentences within the text of the document using, for example, cosine similarity, ontology mapping, or the like. The graphical element integration mechanism considers semantic relationships of different words to determine a sentence related to the natural language description of the image. For example, if the natural language description of the image is "The boy playing with the ball outside" and a sentence is identified that reads "Jonathan is in the grass entertaining himself with his ball" then the graphical element integration mechanism detects this sentence within the text with a most appropriate similarity to the natural language description of the image. Thus, when the speech synthesizer or braille display reads the document to the blind or visually impaired user, during the reading of the text, the graphical element integration mechanism inserts at the end of "Jonathan is in the grass entertaining himself with his ball" a description such as: "An image is provided showing the boy playing with the ball outside." Thus, the graphical element integration mechanism consider whether the text provided is redundant with the description of the graphic and provides an indicator that there is a graphic that represents, when the text is read, so that a later description of the image is not confusing to the user as current screen reader application provide.

The graphical element integration mechanism analyzes the image through one or more image recognition mechanisms to generate a natural language description of the image. The image may be a static image, such as a photo, a table, or a chart. Alternatively, the image may be an embedded video or graphics interchange format (GIF) image.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for intelligently integrating descriptions of images into text of a document for a screen reader, the method comprising:
   determining a natural language understanding image description for an image in the document;
   for each sentence of a set of sentences in the text of the document, determining a relatedness score between the sentence and the natural language understanding image description of the image in the document, thereby forming a set of relatedness scores;
   determining a highest relatedness score from the set of relatedness scores; and
   when the text of the document is read out by the screen reader, reading out, by the screen reader, the natural language image description of the image in the document in close proximity to a sentence associated with the highest relatedness score.

2. The method of claim 1, wherein the determining of the natural language understanding image description for the image comprises generating the natural language understanding description by a natural language description engine.

3. The method of claim 1, wherein the determining the natural language understanding image description for the image comprises identifying a caption associated with the image.

4. The method of claim 1, wherein, responsive to the natural language understanding image description being a capture of a caption associated with the image thereby forming a first natural language understanding image description, the method further comprises:
   generating a second natural language understanding image description for the image using a natural language description engine;
   for each sentence of the set of sentences in the text of the document, determining a relatedness score between the sentence and each of the first natural language understanding image description of the image in the document and the second natural language understanding image description of the image in the document thereby forming the set of relatedness scores;
   determining a highest relatedness score from the set of relatedness scores; and
   when the text is read out by the screen reader, reading out, by the screen reader, in close proximity to the sentence associated with the highest overall relatedness score, either the first natural language image description or the second natural language understanding image description associated with the highest relatedness score.

5. The method of claim 1, further comprising:
   determining whether the highest relatedness score from the set of relatedness scores is at or above a threshold; and
   responsive to the highest relatedness score from the set of relatedness scores being below the threshold, reading out, by the screen reader, the natural language image description in close proximity to the sentence associated with the highest relatedness score.

6. The method of claim 5, further comprising:
   responsive to the highest relatedness score from the set of relatedness scores being at or above the threshold, inhibiting the natural language image description from being read out by the screen reader.

7. The method of claim 1, wherein the image is a graphic interchange format (GIF) image.

8. A computer program product comprising a non-transitory computer readable storage medium having a computer readable program stored therein, wherein the computer readable program, when executed on a computing device, causes the computing device to:
   determine a natural language understanding image description for an image in a document;
   for each sentence of a set of sentences in the text of the document, determine a relatedness score between the sentence and the natural language understanding image description, of the image in the document, thereby forming a set of relatedness scores;
   determine a highest relatedness score from the set of relatedness scores; and
   when the text of the document is read out by the screen reader, read out, by the screen reader, the natural language image description of the image in the document in close proximity to a sentence associated with the highest relatedness score.

9. The computer program product of claim 8, wherein the computer readable program to determine the natural language understanding image description for the image comprises computer readable program to generate the natural language understanding description by a natural language description engine.

10. The computer program product of claim 8, wherein the computer readable program to determine the natural language understanding image description for the image comprises computer readable program to identify a caption associated with the image.

11. The computer program product of claim 8, wherein, responsive to the natural language understanding image description being a capture of the caption associated with the image thereby forming a first natural language understanding image description, the computer readable program further causes the computing device to:

generate a second natural language understanding image description for the image using a natural language description engine;

for each sentence of the set of sentences in the text of the document, determine a relatedness score between the sentence and each of the first natural language understanding image description of the image in the document and the second natural language understanding image description of the image in the document thereby forming the set of relatedness scores;

determine a highest relatedness score from the set of relatedness scores; and when the text is read out by the screen reader, read out, by the screen reader, in close proximity to the sentence associated with the highest relatedness score, either the first natural language image description or the second natural language understanding image description associated with the highest relatedness score.

12. The computer program product of claim 11, wherein the image is a graphic interchange format (GIF) image.

13. The computer program product of claim 8, wherein the computer readable program further causes the computing device to:

determine whether the highest relatedness score from the set of relatedness scores is at or above a threshold; and responsive to the highest relatedness score from the set of relatedness scores being below the threshold, read out, by the screen reader, the natural language image description in close proximity to the sentence associated with the highest relatedness score.

14. The computer program product of claim 13, wherein the computer readable program further causes the computing device to:

responsive to the highest relatedness score from the set of relatedness scores being at or above the threshold, inhibit the natural language image description from being read out by the screen reader.

15. An apparatus comprising:

a processor; and a memory coupled to the processor, wherein the memory comprises instructions which, when executed by the processor, cause the processor to:

determine a natural language understanding image description for an image in a document;

for each sentence of a set of sentences in the text of the document, determine a relatedness score between the sentence and the natural language understanding image description of the image in the document, thereby forming a set of relatedness scores;

determine a highest relatedness score from the set of relatedness scores; and when the text of the document is read out by the screen reader, read out, by the screen reader, the natural language image description of the image in the document in close proximity to a sentence associated with the highest relatedness score.

16. The apparatus of claim 15, wherein the instructions to determine the natural language understanding image description for the image comprises instructions to generate the natural language understanding description generated by a natural language description engine.

17. The apparatus of claim 15, wherein the instructions to determine the natural language understanding image description for the image comprises instructions to identify a caption associated with the image.

18. The apparatus of claim 15, wherein, responsive to the natural language understanding image description being a capture of the caption associated with the image thereby forming a first natural language understanding image description, the instructions further cause the processor to:

generate a second natural language understanding image description for the image using a natural language description engine;

for each sentence of the set of sentences in the text of the document, determine a relatedness score between the sentence and each of the first natural language understanding image description of the image in the document and the second natural language understanding image description of the image in the document thereby forming the set of relatedness scores;

determine a highest relatedness score from the set of relatedness scores; and when the text is read out by the screen reader, read out, by the screen reader, in close proximity to the sentence associated with the highest relatedness score, either the first natural language image description or the second natural language understanding image description associated with the highest relatedness score.

19. The apparatus of claim 15, wherein the instructions further cause the processor to:

determine whether the highest relatedness score from the set of relatedness scores is at or above a threshold; and responsive to the highest relatedness score from the set of relatedness scores being below the threshold, read out, by the screen reader, the natural language image description in close proximity to the sentence associated with the highest relatedness score.

20. The apparatus of claim 19, wherein the instructions further cause the processor to:

responsive to the highest relatedness score from the set of relatedness scores being at or above the threshold, inhibit the natural language image description from being read out by the screen reader.

\* \* \* \* \*